US011861387B2

(12) United States Patent
Kelly (10) Patent No.: US 11,861,387 B2
(45) Date of Patent: Jan. 2, 2024

(54) MIGRATION OF GUEST OPERATING SYSTEM OPTIMIZATION TOOL SETTINGS IN A MULTI-HYPERVISOR DATA CENTER ENVIRONMENT

(71) Applicant: DELL PRODUCTS L.P., Round Rock, TX (US)

(72) Inventor: John Kelly, Mallow (IE)

(73) Assignee: DELL PRODUCTS L.P., Round Rock, TX (US)

(*) Notice: Subject to any disclaimer, the term of this patent is extended or adjusted under 35 U.S.C. 154(b) by 401 days.

(21) Appl. No.: 16/898,300

(22) Filed: Jun. 10, 2020

(65) Prior Publication Data

US 2021/0389964 A1 Dec. 16, 2021

(51) Int. Cl.
*G06F 9/455* (2018.01)
*G06F 9/445* (2018.01)
*G06N 20/00* (2019.01)
*G06N 5/025* (2023.01)

(52) U.S. Cl.
CPC ...... *G06F 9/45545* (2013.01); *G06F 9/44505* (2013.01); *G06F 9/45558* (2013.01); *G06N 5/025* (2013.01); *G06N 20/00* (2019.01); *G06F 2009/4557* (2013.01); *G06F 2009/45595* (2013.01)

(58) Field of Classification Search
CPC ............. G06F 9/45545; G06F 9/44505; G06F 9/45558; G06F 2009/4557; G06F 2009/45595; G06N 5/025; G06N 20/00; G06N 3/006; G06N 5/003; G06N 20/20; G06N 3/08; G06N 3/0454; G06N 7/005; G06N 20/10; G06N 3/0445
See application file for complete search history.

(56) References Cited

U.S. PATENT DOCUMENTS

| | | | |
|---|---|---|---|
| 2015/0263986 A1* | 9/2015 | Park | H04L 41/0896 709/226 |
| 2016/0048408 A1* | 2/2016 | Madhu | H04L 47/783 718/1 |
| 2016/0314014 A1* | 10/2016 | Dow | G06N 20/00 |
| 2016/0335109 A1* | 11/2016 | Ryu | G06F 9/45558 |
| 2020/0004582 A1* | 1/2020 | Fornash | G06F 9/4856 |
| 2020/0341797 A1* | 10/2020 | Tsirkin | G06F 3/0664 |
| 2021/0216346 A1* | 7/2021 | Mahanta | G06F 9/3891 |

\* cited by examiner

*Primary Examiner* — Kenneth Tang
(74) *Attorney, Agent, or Firm* — NORTH WEBER & BAUGH LLP (57) ABSTRACT

Presented herein are embodiments for automating analytics-based migration of virtual machine optimization tool settings to different hypervisor environments. Currently, no marketplace workload migration utilities have previously dealt with this scenario. In one or more embodiments, a system gathers data and uses analytics on the data to devise one or more translation/correlation rules or models for virtual machine migration. In one or more embodiments, using historical manually settings, correlations can be determined. Given data about a source guest operating system (OS) tool settings, one or more translation/correlation models may be used to facilitate the translation of guest OS optimization tool settings from the source environment to the destination environment so that migrated virtual machine functions the same as or nearly the same as it did on the source hypervisor.

20 Claims, 6 Drawing Sheets

MIGRATION OF GUEST OPERATING SYSTEM OPTIMIZATION TOOL SETTINGS IN A MULTI-HYPERVISOR DATA CENTER ENVIRONMENT

BACKGROUND

The present disclosure relates generally to information handling systems. More particularly, the present disclosure relates to systems and method for migration of guest operating system (OS) optimization tool settings in a multi-hypervisor data center environment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the cloud operating model becomes increasingly common, one of the scenarios that is also growing is a multi-cloud model. Multi-cloud environments are increasingly becoming more pervasive as organizations seek to utilize the varying cost, security, and functionality profiles of different cloud models and locations. In multi-cloud environments, customers operate multiple cloud environments simultaneously, with these cloud environments being either off-premise or on-premise clouds.

At their core, these differing cloud environments are often built on different hypervisors. For example, VMware of Palo Alto, California offers VMware vSphere and Microsoft Corporation of Redmond, Washington offers Hyper-V. Each of these hypervisor environments usually includes a suite of utilities to enhance guest OS performance in a virtualized environment based on the relevant hypervisor (e.g., VMware tools for VMware vSphere and Hyper-V integration services for Microsoft Hyper-V).

Current methods for migrating workloads between hypervisors do not comprehend any mechanism to map optimization settings between these suites of utilities, since there is usually no direct correspondence or one-to-one correlation between the settings in the various utility suites for the different hypervisors.

Accordingly, it is highly desirable to find ways of providing analytics-based migration of utility suite settings during an inter-hypervisor migration.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

A. General Overview and System Embodiments

As noted above, as multi-cloud environments have become very pervasive—especially with differing cloud environments being built on different hypervisors. Because operating systems are primarily designed to operate on actual hardware—as opposed to virtual hardware in the case of virtual machines—each hypervisor environment usually includes a suite of utilities to enhance guest OS performance in a virtualized environment. These tools help configure settings to improve performance of the guest OS in the virtualized environment. For example, special confirmation may be required for a myriad of issues such as time synchronization, ability to communicate with the hypervisor, connections to physical port, and ability to run scripts—just to name a few.

However, as noted above, because each vendor's hypervisor environment differs and because each vendor's guest OS utility tools vary, it is a difficult, if not practically impossible, process that is potentially error-prone to migrate a guest OS optimization tool settings of a virtual machine when migrating the virtual machine from one hypervisor environment to another hypervisor environment. Preferably, the migrated virtual machine should function the same as (or have the same functionality) as before migration. The migration of guest OS optimization tool/configuration tool settings is far from a straightforward process because there is no standardization; thus, there are no direct correlations between setting for different hypervisors and guest OS optimization utility tools. As a practical matter, guest OS optimization tool/configuration tool settings migration cannot efficiently be performed manually since the inventory of settings is not the same between different providers/vendors, and there is usually no obvious logical correlation that would allow for manual mapping between feature settings.

Given that that task is extremely challenging to perform manually, there are some tools that exist for virtual machine migration between difference hypervisors. Examples include VMware vCenter Converter, VMware HCX, and StarWind V2V Converter. These tools attempt to deal with the guest OS optimization utility suites and do so in different ways, but their abilities are limited. For example, the VMware tools allow customers to install VMware tools with default settings but has no ability to comprehend existing settings in other hypervisor environments. And, the StarWind tool by StarWind of Beverly, MA does not deal with guest OS optimization utility suites. None of these offerings involves intelligent automation nor offer analytics-based migration.

Accordingly, embodiments herein facilitate analytics-based migration of utility suite settings during an inter-hypervisor migration. In one or more embodiments, correlations between configuration settings for the guest OS optimization utility suites associated with different hypervisors are detected. Where correlation exists, in one or more embodiments, the relevant setting on the destination utility suite may be automatically configured to the required value (s) as part of the inter-hypervisor migration. Thus, embodiments herein provide systems and methods to intelligently automate the migration of settings between the guest OS optimization utility suites for different hypervisors; no other marketplace workload migration utilities attempt to deal with such scenarios.

Figure 1:
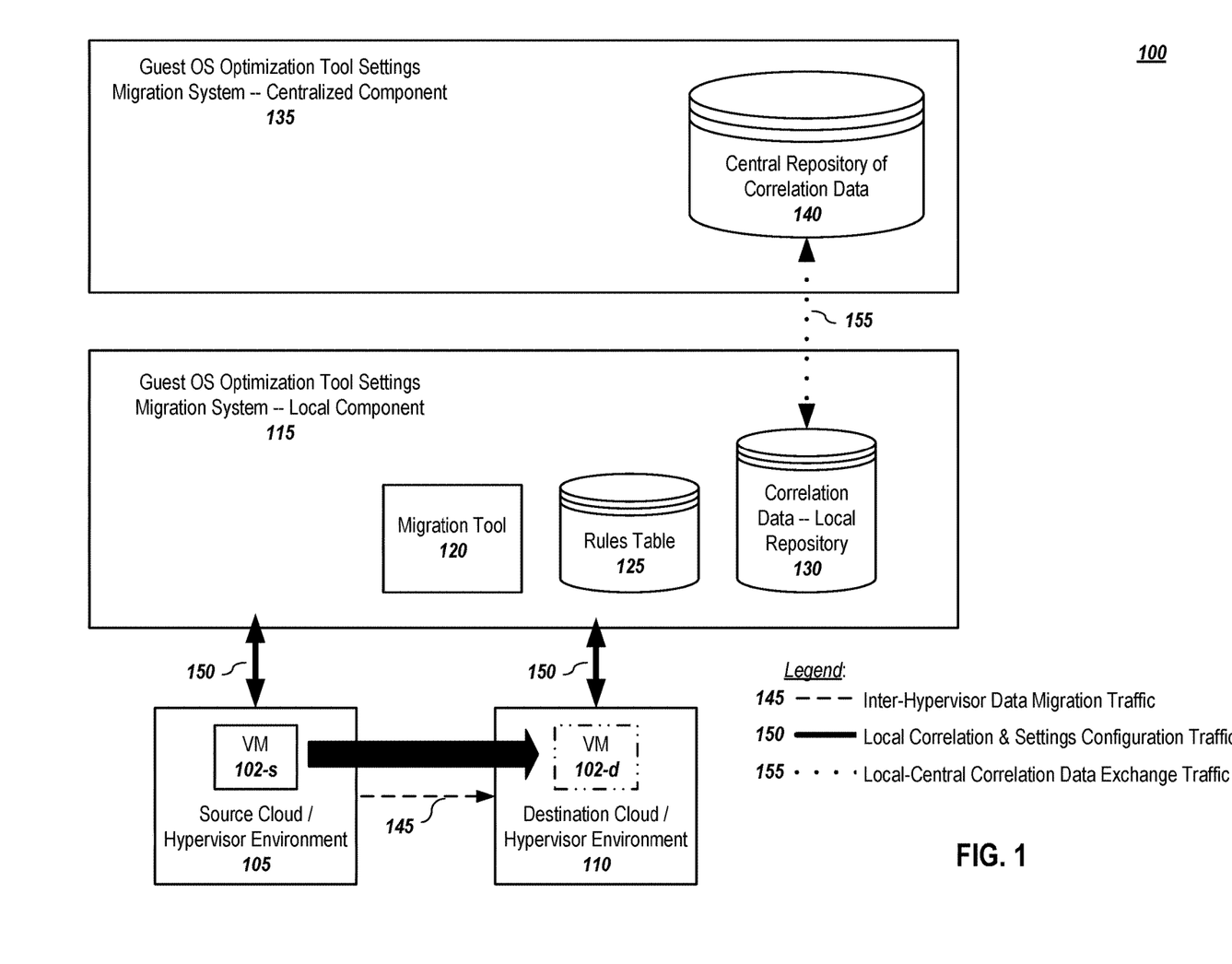
FIG. 1 depicts a system architecture that facilitates migration of guest operating system (OS) optimization tool settings in a multi-hypervisor data center environment, according to embodiments of the present disclosure.

FIG. 1 depicts a system architecture that facilitates migration of guest OS optimization tool settings for a virtual machine migration in a multi-hypervisor data center environment, according to embodiments of the present disclosure. The system 100 may be used to provide an analytics-based approach to translate settings used by the guest OS optimization tool on one cloud/hypervisor 105 to settings used by the guest OS optimization tool on the other cloud/hypervisor 110. Depicted in FIG. 1, a virtual machine (VM) or virtual desktop 102-s operates on a source cloud/hypervisor environment 105. The virtual machine 102-s is to be migrated 145 to a different hypervisor 110 as virtual machine 102-d. As part of the migration process, settings for the virtual machine 102 will need to be configured so that it will operate properly on the destination cloud/hypervisor environment 110.

Also depicted in FIG. 1 is a guest OS optimization tool settings migration system local component or system 115 and a guest OS optimization tool settings migration system centralized component or system 135. In one or more embodiments, a guest OS optimization tool settings migration system local component 115 comprises three main components. It should be noted that embodiments of the present disclosure may operate in various settings, including cloud settings; therefore, it shall be noted that the use of term "local" indicates that the settings are specific to a certain client, organization, deployment, virtual machine instance, etc. It does not require that the local component or system be physically local to the virtual machine instance. Rather, it may be located on one or more remote computing systems.

As shown in the depicted embodiment, the local system 115 includes a local repository of correlation data 130. In one or more embodiments, the local repository 130 comprises migration data related to a specific client, organization, deployment, virtual machine instance, etc. In one or more embodiments, the data may include historical data related to previous and/or current virtual machine migrations. As will discussed in more detail below, the historical data may be used to identify correlations between configuration settings for the guest OS optimization utility suites associated with different hypervisors. In one or more embodiments, the local repository 130 also comprises, based at least in part on the correlations, the relevant mappings between the configuration settings for the virtual machine on the source hypervisor and the configuration settings for the virtual machine on the destination hypervisor for an inter-hypervisor migration from the source hypervisor to the destination hypervisor. In one or more embodiments, the local repository 130 is communicatively coupled 155 to a central external repository 140, which may be part of the guest OS optimization tool settings migration system centralized system 135, and exchanges data with the central external repository 140. In one or more embodiments, the exchanged data 155 may be the historical data, the correlation data, rules, or a combination thereof.

In one or more embodiments, the local system 115 comprises a rules table or repository 125, which stores one or more user-definable sets of rules. The user-definable rules may be used to override and/or supplement correlation models defined in the local and/or central correlation repositories.

In one or more embodiments, the local system 115 comprises a migration tool 120 that uses one or more application program interfaces (APIs) or other functions or scripts to obtain 150 information about the hypervisor and/or virtual machine configurations that may be used to help determine migration settings, to implement 150 a desired set of settings, or both.

Consider, by way of illustration, the following example. Assume that source cloud/hypervisor environment 105 is a Microsoft Hyper-V environment. Hyper-V integration services contains a list of settings that may be set by a user/administrator to activate different features of the integration services. Some examples of services include Data Exchange, Heartbeat, and Time Synchronization. Also assume that the destination cloud/hypervisor environment 110 is vSphere, a VMware-based hypervisor environment. Like Hyper-V, VMware's tools also contain a list of similar—but not identical—settings, such as VMCI (Virtual Machine Communication Interface) driver, Drive Sync (Filesystem Sync driver), Host Time Synchronization and Mouse (VMware Mouse Driver). In one or more embodiments, historical correlation may be obtained or detected using monitoring tools, such as perfmon (a performance monitoring tool), to collect data from existing cloud environments before and after inter-hypervisor migration. In one or more embodiments, for correlation purposes, the specific direction of migration is noted with the data collection. Because there is no standardization related to these tools and settings, there may instances where settings do not correlate one-to-one. Thus, in one or more embodiments, correlations of settings are considered migration direction specific (e.g., Hyper-V to vSphere correlation would not necessarily imply correlation for vSphere to Hyper-V). For example, a single setting in Hyper-V may be correlated to many settings in vSphere (thereby being a one-to-many correlation), but if the virtual machine was being migrated from a vSphere hypervisor environment to a Hyper-V hypervisor environment, it may be a many-to-one correlation.

In one or more embodiments, the migration-direction-specific information is collected and used to provide guidance on correlated parameters in the destination environment—that is, based on what correlations exist in the operational environment after initial configuration has been completed. It should be noted that, in one or more embodiments, correlation may also be detected on an ongoing basis during usage in the environment.

As well as historical correlation from the various environments, in one or more embodiments, internal migration decisions may be weighted to allow local configuration setting migration requirements to override correlation detected from prior or centralized historical datasets. For example, the rules table 125 may have one or more rules related to one or more settings that have precedence over any local or global correlations rules. In one or more embodiments, one or more rules may supplement the set of correlation settings. Given a final set of configurations settings, the guest OS optimization tool settings migration system 115 may implement or configure the values of the settings for the migrated virtual machine 102-d. In one or more embodiments, the correlated settings may be implemented via a destination guest OS tool.

B. Methodology Embodiments

1. Correlation Method Embodiments

Figure 2:
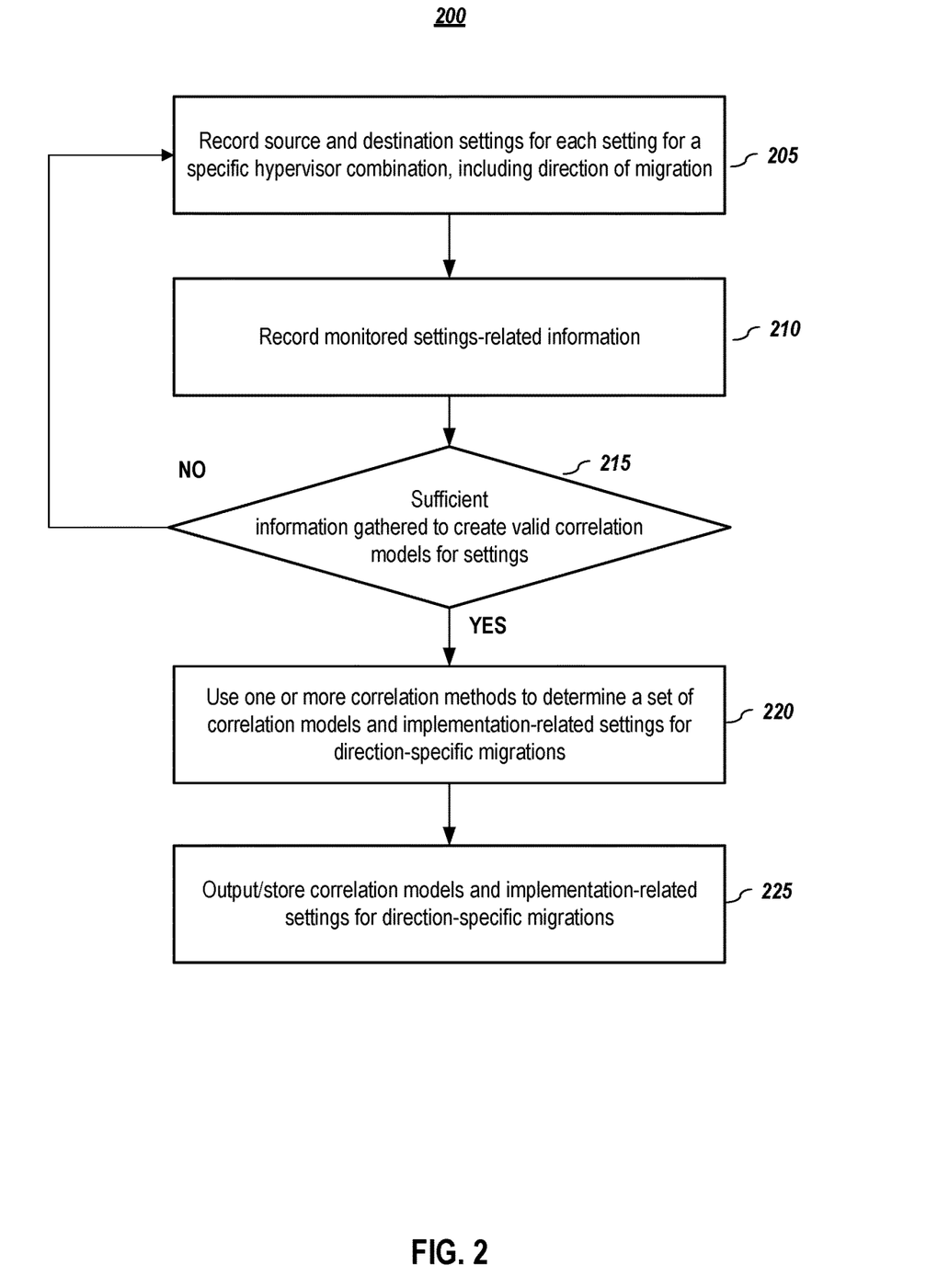
FIG. 2 depicts a methodology for generating correlations between different guest OS optimization tool settings, according to embodiments of the present disclosure.

FIG. 2 depicts a methodology for generating correlations between different guest OS optimization tool settings, according to embodiments of the present disclosure. A core of the methodology depicted in FIG. 2 is the collection of data related to migrated virtual machines. In one or more embodiments, the data collection may be local (e.g., specific to a particular entity/organization), may be global (e.g., collected across a number of different entities/organizations), or both. It should be noted that there are a number of benefits of collecting data globally but noting the source of the data, which can allow for local correlations, comparisons of correlations across different data sources, and the like. In so doing, more data is collected, which tends to provide for better correlation predictions. Another benefit of global collection is that it affords potential correlation information for an entity even if that entity has not performed that specific migration. For example, if entity X has never migrated to a particular hypervisor type but others have, entity X can utilize the correlation results from data collected from others who have done that type of migration.

And, because the results are at the correlation level, it anonymizes the underlying data—no company-specific information is shared. Yet another benefit of capturing the data source information of multiple entities/organizations, more unique or distinction correlations can be generated. For example, correlations may be predicted for a specific entity/organization, for a set of similarly situated entities/organizations, and/or globally.

As illustrated in FIG. 2, in one or more embodiments, both the settings used by a guest OS optimization tool on the source cloud/hypervisor for a virtual machine being migrated or that has been migrated and the settings used by the guest OS optimization tool on the destination cloud/hypervisor are recorded (205). As noted above, because the different guest OS tools have different features and differently configured or offered features, there is no readily apparent correlations for some features. Furthermore, the feature correlations may be complex—one-to-one correlations, one-to-many correlations, many-to-one correlations, no correlations, partial correlations (e.g., one-to-one partial correlation, one-to-many partial correlation, many-to-one partial correlation), etc. In addition, the parameter(s) associated with the correlation can vary and may add further complexity. For example, some features may be represented by an activated/inactivate parameter value, while others may require an entry, such as a numerical value or a setting command. In the case of a numerical value, a value within a numerical range may be acceptable; and thus, in one or more embodiments, the correlation process may determine the range, and alternatively or additionally, provide an estimated preferred value. Thus, in one or more embodiments, historical data related to migrated virtual machines is collected.

In one or more embodiments, settings-related information is also collected (210). That is, in addition to the guest OS tool settings that are collected, hypervisor setting information may also be collected. While it may be that at least one or more of these hypervisor settings may not be adjusted, at least by the guest OS tool, the hypervisor setting information may still be useful in automating the migration correlation process as these underlying features or settings may affect what features are offered or enabled at the guest OS tool level. Because different cloud providers may enable or disable different features of the hypervisors or configure the hypervisors in specific ways, the information may be used to create more accurate and nuisance correlations related to the guest OS tool level features.

In one or more embodiments, the data collection processes are continued until sufficient data has been collected (215). It shall be noted that even after sufficient data has been collected, in one or more embodiments, additional data may be collected to update correlation models, improve correlation models, add or remove correlation models to reflect changes to the underlying technology, and the like.

In one or more embodiments, one or more correlation methods may be used to determine correlations and implementation-related settings for direction-specific migrations. In one or more embodiments, deep learning methodologies may be employed to develop correlations for direction-specific migrations. For example, the settings for the guest OS tool and the source hypervisor settings may be used as input features into a neural network model, such as a fully connected neural network, an recurrent neural network, a convolution neural network, or a combination thereof, which uses the corresponding guest OS tools settings for the migrated virtual machine and the destination hypervisor settings as ground truth data to train the model to determine the correct correlations. In one or more embodiments, other machine learning techniques may also additionally or alternatively be employed. For example, regressions, classification methods, clustering methods, reinforcement learning methods, decision trees, random forests, support vector machines, and Pearson correlation coefficient methods may be employed to develop correlation models.

In one or more embodiments, other unsupervised methodologies, such as inference prediction, may be used to generate correlation predictions/models. Consider the following example, which is provided by way of illustration. Assume that multiple integration services, such as Hyper-V Data Exchange Service, Hyper-V Guest Service Interface, and Hyper-V PowerShell Direct Service, have been disabled at the source hypervisor. These features being disabled indicate a very conservative or secure posture; thus, an equally conservative security posture should be adopted in the destination/target hypervisor environment. In the case of VMware tools, this may result in the disablement of the capability for the guest OS to monitor certain performance/resource utilization parameters on the host, the exclusion of all filesystems from the quiesced snapshots list, etc.

It shall be noted that by applying an analytics approach, there may be correlations detected which are intuitively not obvious. For example, it may be determined by the data that disconnecting a network adapter on the VMware side and allowing direct management with PowerShell without a network connection on the HyperV side may be appropriate correlation.

In one or more embodiments, the data collection processes of FIG. 2 may include collection of data related to migrations that used one or more correlation models. Differences in settings between what was suggested in a correlation model and the actual deployment may be used to refine the model.

Related to step 220 and step 215, in one or more embodiments, the sufficiency of the correlations may be used to determine whether sufficient data has been collected, in which the collected data is used as ground truth data to verify accuracy of predicted correlations.

Having developed a set of one or more migration-direction-specific correlation models, the guest OS tool correlations and hypervisor implementation-related settings for specific directional migrations may be output/stored (225). In one or more embodiments, the correlations may be stored locally (e.g., local repository 130 of FIG. 1), globally/centrally (e.g., central repository 140 of FIG. 1), or both.

In one or more embodiments, embodiments of the data collection and correlation modeling may be performed by the migration tool 120. In one or more embodiments, the centralized system 135 may additionally or alternatively include a migration tool to perform correlation modeling.

2. Analytics-Based Migration Method Embodiments

Figure 3:
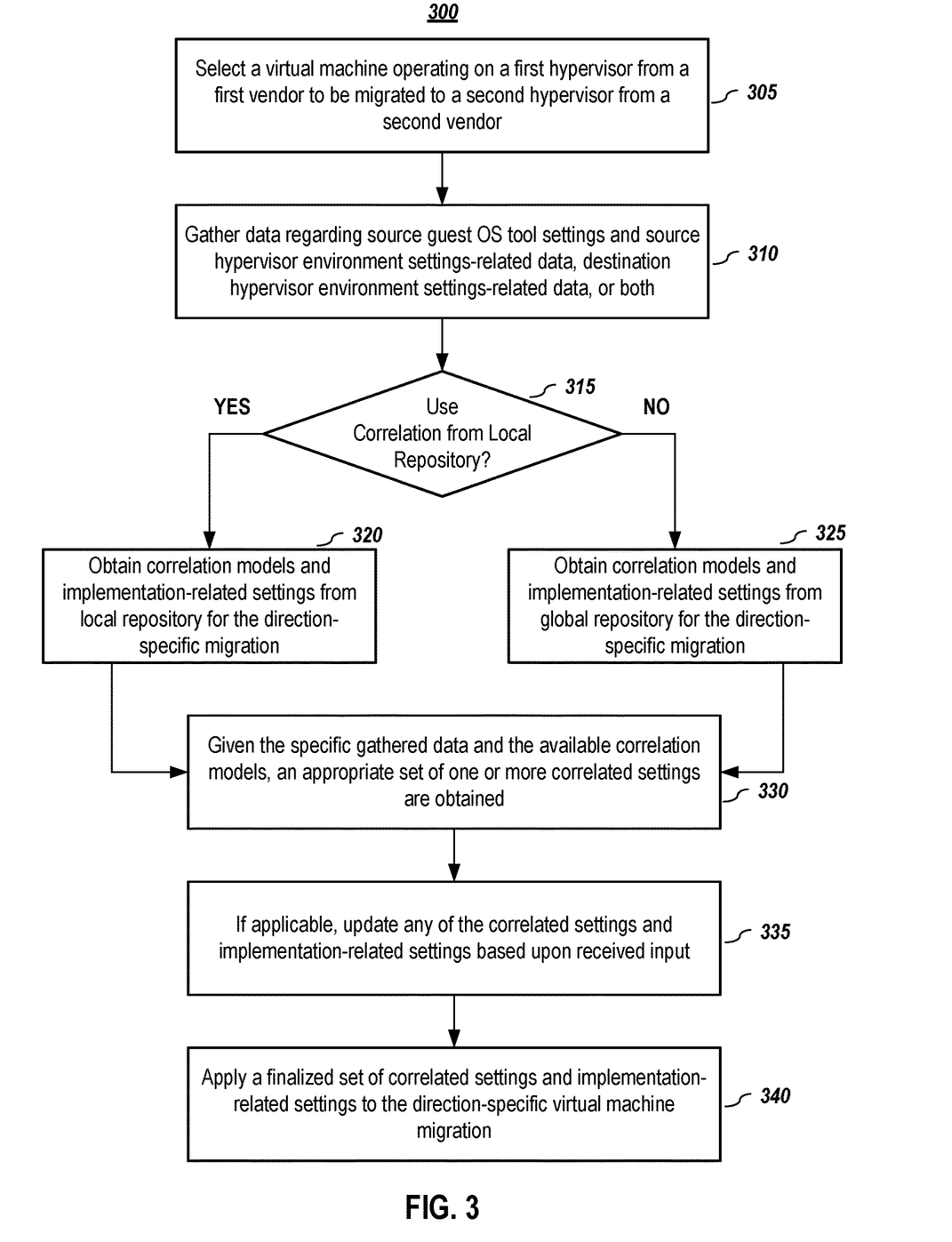
FIG. 3 depicts a methodology for analytics-based migration of guest operating system (OS) optimization tool settings in a multi-hypervisor data center environment, according to embodiments of the present disclosure.

FIG. 3 depicts a methodology for analytics-based migrating of guest OS optimization tool settings in a multi-hypervisor data center environment, according to embodiments of the present disclosure.

In one or more embodiments, a virtual machine operating on a first hypervisor environment from a first vendor is selected (305) to be migrated to a second hypervisor environment from a second vendor. In one or more embodiments, the analytics-based migration system gathers (310) data regarding the source guest OS tool settings and hypervisor environment settings-related data for the source hypervisor environment, the destination hypervisor environment, or both.

A check is made (315) whether the correlation repository that is to be used is to be from a local repository or from a central repository. Depending upon the selection, the analytics-based migration system obtains (320/325) correlation models and implementation-related settings from the selected repository for the direction-specific migration.

In one or more embodiments, given the specific data gathered related to the migration and the selected correlations repository, the analytics-based migration system determines (330) an appropriate set of correlated settings and implementation-related settings for the direction-specific virtual machine migration. In one or more embodiments, the analytics-based migration system may receive (335) input related to the set of correlated settings and implementation-related settings for the direction-specific virtual machine migration. For example, the analytics-based migration system may check a rules dataset to determine whether any of the set of correlated settings and implementation-related settings for the direction-specific virtual machine migration should be adjusted based upon one or more rules. For example, the rules dataset may overrule certain aspects of a correlation as defined by an applied rule or rules.

Whether there are any applicable rules or not, a finalized set of correlated settings and implementation-related settings for the direction-specific virtual machine migration may then be applied (340) at the destination hypervisor for the virtual machine migration. In one or more embodiments, the system may use a remote call to an interface, such as a command line utility like VMwareToolboxCmd.exe, PowerShell, etc., to set the relevant parameter or parameters to the required value or values.

Figure 4:
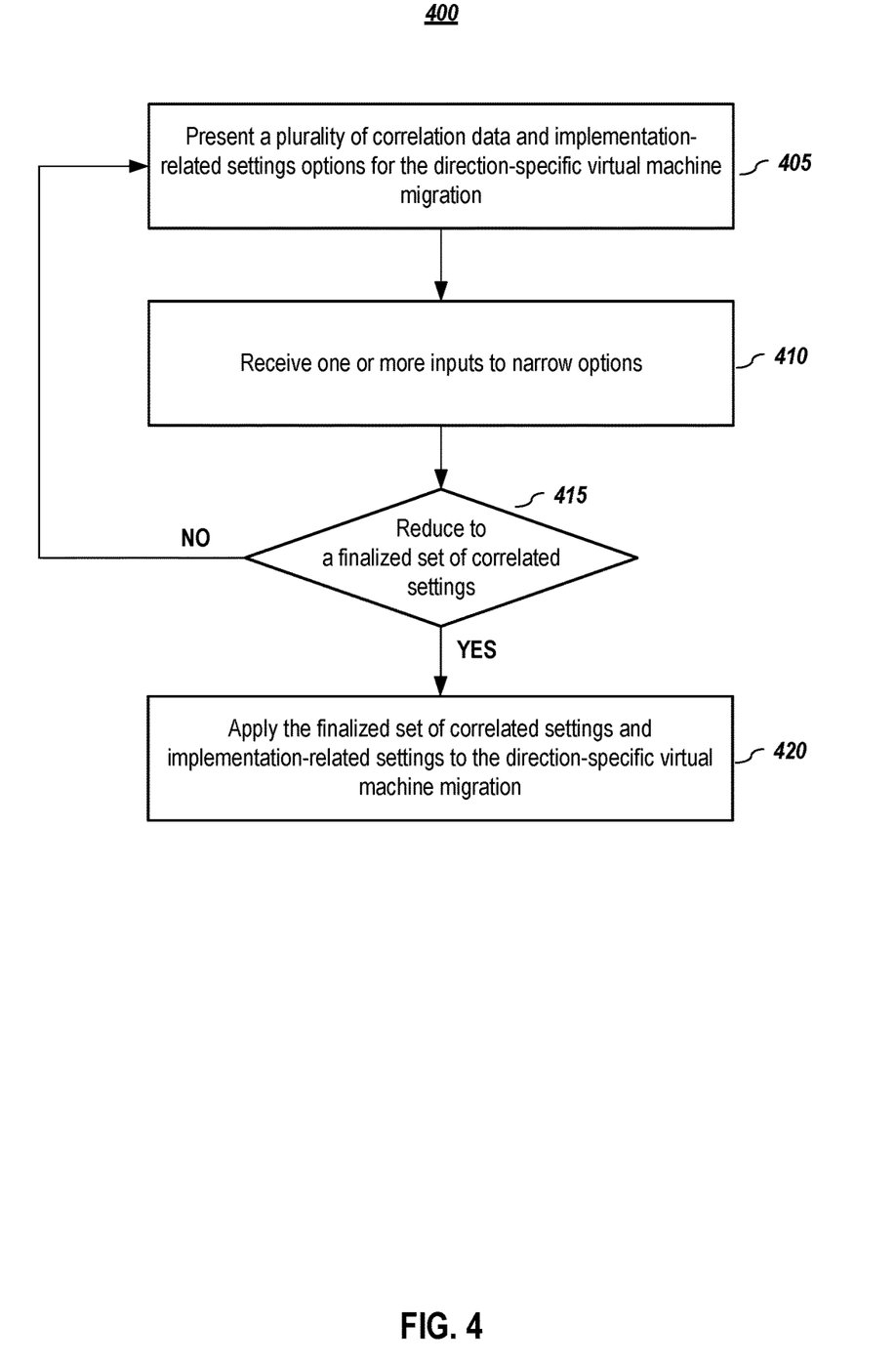
FIG. 4 depicts another methodology for analytics-based migration of guest operating system (OS) optimization tool settings in a multi-hypervisor data center environment, according to embodiments of the present disclosure.

It shall be noted that, with the exception of the selection of the virtual machine for migration, the embodiments of FIG. 3 may be applied programmatically (i.e., with limited or no user input) once the correlation repository and rules have been set. However, it shall be noted that one or more of the steps of FIG. 3 may include prompting a user for input. FIG. 4 depicts example embodiments in which user input is provided as part of the process.

It shall be noted that in the embodiments depicted related to FIG. 3, implementation-related settings about the source hypervisor implementation, the destination hypervisor implementation or both were obtained and considered as part of the migration. In one or more embodiments, gathering data about the source hypervisor implementation, the destination hypervisor implementation or both and/or obtaining implementation settings for the destination hypervisor may be optionally performed.

FIG. 4 depicts another methodology for analytics-based migration of guest operating system (OS) optimization tool settings in a multi-hypervisor data center environment, according to embodiments of the present disclosure. In one or more embodiments, given the specific data gathered related to the migration and the applicable correlation models in the repository, a number of correlations may be appropriate. Thus, in one or more embodiments, the analytics-based migration system presents (405) a plurality of correlations options (and, in embodiments, potentially implementation-related settings options) for the direction-specific virtual machine migration to a user for input.

In addition to there being more than one correlation option available, one or more of the correlations may accept a range of values. Thus, the input may also include requesting that a value for a parameter be supplied (although a default value may be set if none is supplied). Accordingly, in one or more embodiments, the analytics-based migration system may request that the user provide input.

Accordingly, in one or more embodiments, a user may provide (410) addition data to help narrow the options, to supply values for numerical ranges, to supply data that was not available or that the system was unable to gather (e.g., certain hypervisor implementation-related data), or some combination thereof.

Given the inputted data, the number of correlations that are available may be reduced. If the available correlation data and implementation-related settings is sufficiently reduced (415) to be implementable, the process may apply (420) the finalized set of correlated settings and implementation-related settings to the directional-specific virtual machine migration. Otherwise, the process may present (405) the reduced set of correlated settings and request further input (410).

While not depicted in FIG. 4, it should be noted that, like embodiments discuss in reference to FIG. 3, any aspect of the finalized correlated data settings and hypervisor implementation settings may be overridden by a user, either directly or via a set of predefined rules.

It shall be noted that in the embodiments depicted related to FIG. 4, implementation-related settings about the source hypervisor implementation, the destination hypervisor implementation or both were obtained and considered as part of the migration. In one or more embodiments, gathering data about the source hypervisor implementation, the destination hypervisor implementation or both and/or obtaining implementation-related settings for the destination hypervisor may be optionally performed.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 5:
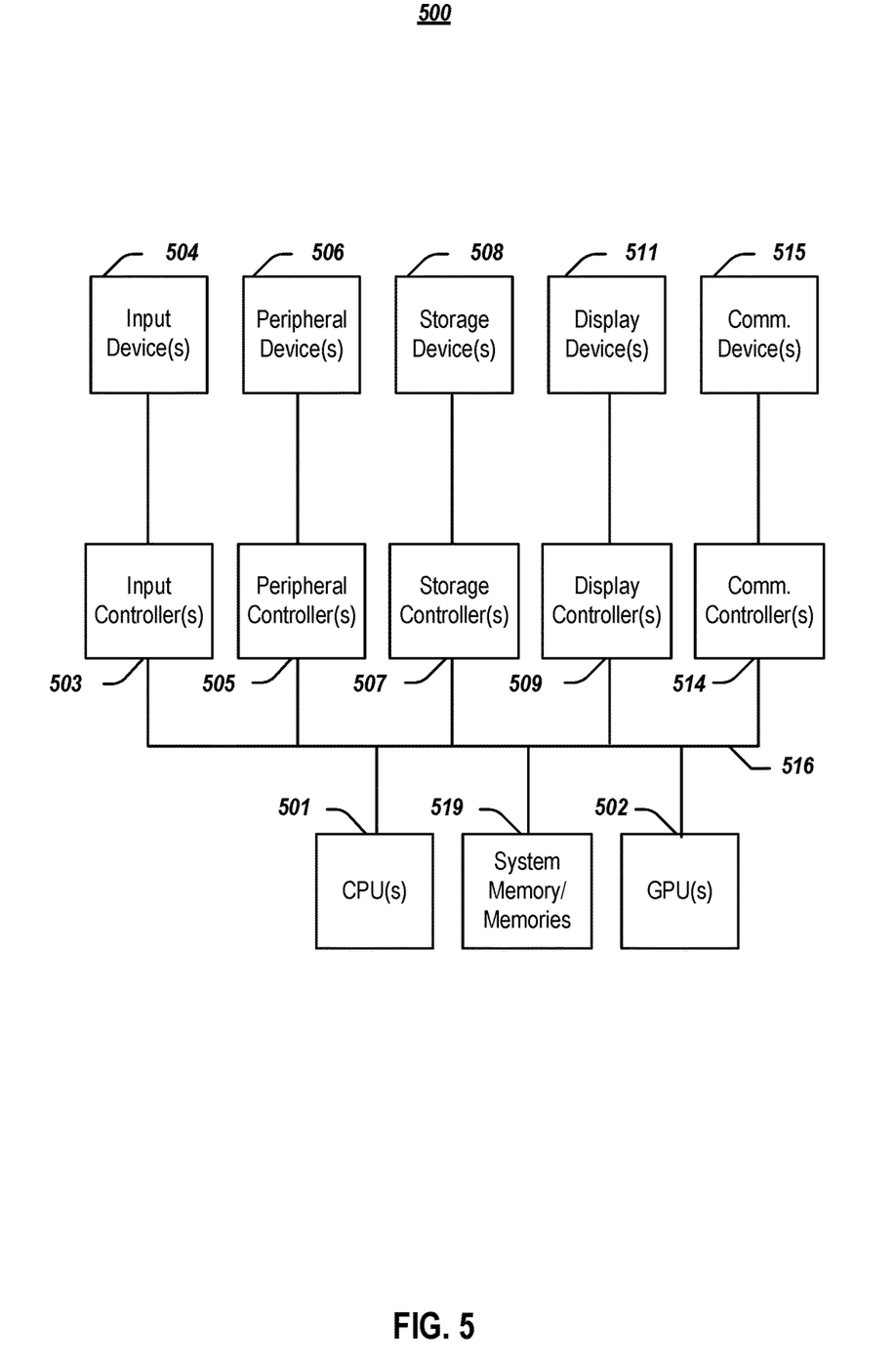
FIG. 5 depicts a simplified block diagram of an information handling system, according to embodiments of the present disclosure.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like, and may also include one or more graphics processing units (GPU) 519 and/or a floating-point coprocessor for mathematical computations. In one or more embodiments, one or more GPUs 519 may be incorporated within the display controller 509, such as part of a graphics card or cards. The system 500 may also include a system memory 502, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
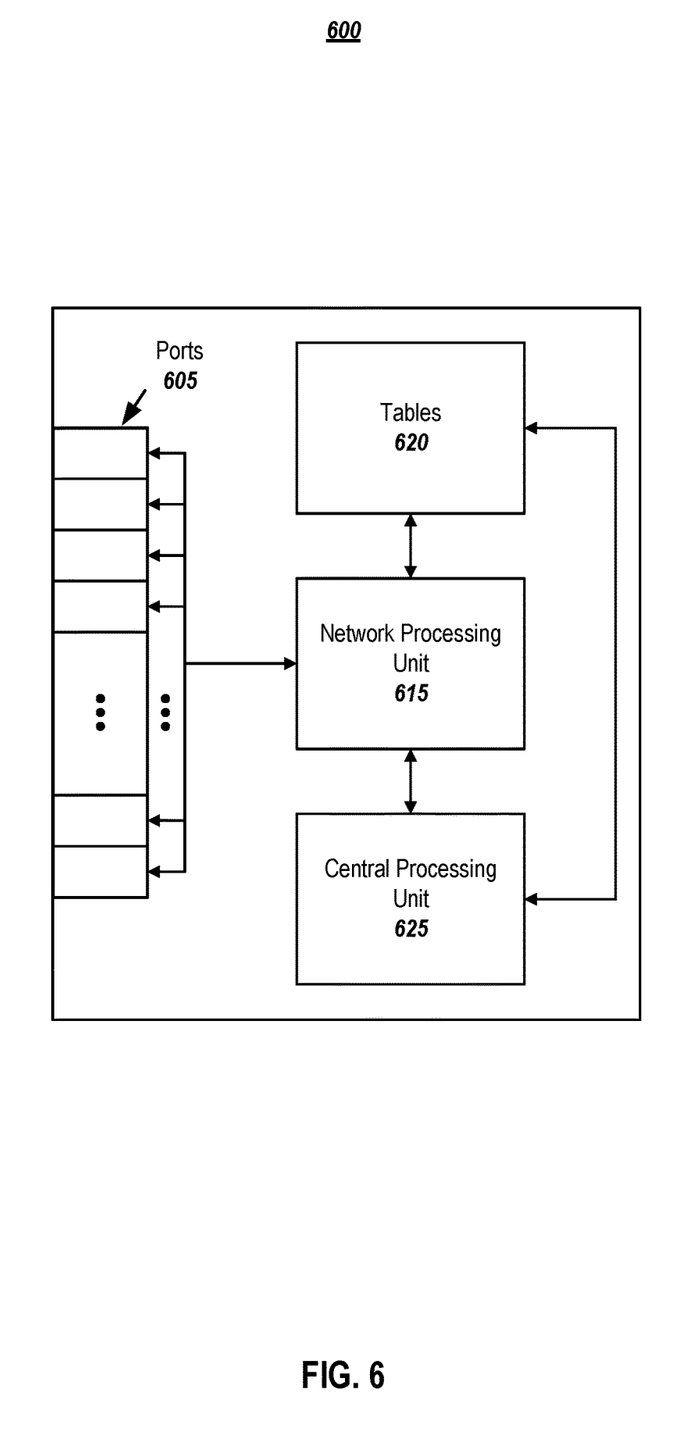
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for determining settings for migration of a virtual machine comprising:
   given a virtual machine of a first type comprising a guest operating system (OS) operating on a source hypervisor that has been selected for migration to a virtual machine of a second type operating on a destination hypervisor that is of a different type than the source hypervisor:
      gathering data regarding source guest OS tool settings, which help improve performance of the source guest OS in the source hypervisor's virtualized environment by affecting at least one of data exchange and time synchronization, about the virtual machine operating on the source hypervisor;
      obtaining, from a repository, a set of settings correlation models for a direction-specific migration from the source hypervisor to the destination hypervisor;
      using at least some of the gathered data and at least one or more correlation models from the set of setting correlation models for the direction-specific migration, determining a set of correlated settings for the direction-specific migration of the virtual machine from the source hypervisor to the destination hypervisor; and
      applying a finalized set of correlated settings obtained from the set of correlated settings to a destination guest OS tool for the virtual machine.

2. The computer-implemented method of claim 1 wherein the finalized set of correlated settings are obtained from the set of correlated settings by performing at least one step comprising:
   using the set of correlated settings as the finalized set of correlated settings;
   updating the set of correlated settings using one or more pre-defined rules that override at least one of the correlated settings in the set of correlated settings;
   updating the set of correlated settings using one or more user-supplied inputs; and
   updating one or more values for one or more correlated settings in the set of correlated settings.

3. The computer-implemented method of claim 1 further comprising:
   gathering data regarding source hypervisor-related settings, data regarding destination hypervisor-related settings, or both; and
   using at least some the gathered data in determining one or more implementation-related settings for the destination hypervisor for the direction-specific migration.

4. The computer-implemented method of claim 1 further comprising:
   for each virtual machine from a set of migrated virtual machines:
      recording source guest OS tool settings data about the virtual machine operating on the source hypervisor; and
      recording destination guest OS tool settings data about the virtual machine operating on the destination hypervisor after migration;
   using the source guest OS tool settings data and the corresponding destination guest OS tool settings data for the set of migrated virtual machines as training data to develop at least some of the set of settings correlation models for the direction-specific migration using one or more machine learning techniques; and
   storing the at least some of the set of settings correlation models for the direction-specific migration in a datastore.

5. The computer-implemented method of claim 4 further comprising:
   recording monitored settings-related information related to the source hypervisor, the destination hypervisor, or both; and
   using at least some of the monitored settings-related information when developing at least some of the set of settings correlation models for the direction-specific migration.

6. The computer-implemented method of claim 4 wherein one of the one or more machine learning techniques is a Pearson correlation coefficient that correlates one or more settings in the source guest OS tool settings to one or more settings in the destination guest OS tool settings.

7. The computer-implemented method of claim 1 wherein the step of obtaining, from a repository, a set of settings correlation models for the direction-specific migration from the source hypervisor to the destination hypervisor comprising:
   determining whether to obtain the set of settings correlation models from a local datastore or a centralized datastore;
   responsive to determining to obtain the set of settings correlation models from the local datastore, accessing the set of settings correlations models from the local datastore; and
   responsive to determining to obtain the set of settings correlation models from the centralized datastore, accessing the set of settings correlations models from the centralized datastore.

8. A computer-implemented method for determining settings for migration of a virtual machine comprising:
   for each virtual machine from a set of migrated virtual machines:
      recording source guest operating system (OS) tool settings data about the virtual machine operating on a source hypervisor, in which the source guest OS tool settings help improve performance of the source guest OS in a source hypervisor environment by affecting at least one of data exchange and time synchronization; and recording destination guest OS tool settings data about the virtual machine operating on a destination hypervisor that is of a different type than the source hypervisor after migration of the virtual machine to the destination hypervisor, in which the destination guest OS tool settings help improve performance of the destination guest OS in a destination hypervisor environment by affecting at least one of data exchange and time synchronization;

using the source guest OS tool settings data and the corresponding destination guest OS tool settings data for the set of migrated virtual machines as training data to develop a set of settings correlation models for a direction-specific migration using one or more machine learning techniques, in which the set of setting correlation models correlate one or more settings of the source guest OS tool for a virtual machine operating on a first hypervisor to one or more settings of the destination guest OS tool for the virtual machine operating on a second hypervisor after migration; and storing the at least some of the set of settings correlation models for the direction-specific migration in a datastore.

9. The computer-implemented method of claim 8 further comprising:

recording monitored settings-related information related to the source hypervisor, the destination hypervisor, or both; and using at least some of the monitored settings-related information when developing at least some of the set of settings correlation models for the direction-specific migration.

10. The computer-implemented method of claim 8 wherein one of the one or more machine learning techniques is a Pearson correlation coefficient that correlates one or more settings in the source guest OS tool settings to one or more settings in the destination guest OS tool settings.

11. The computer-implemented method of claim 10 further comprising:

responsive to a Pearson correlation coefficient not achieving an acceptable threshold value:
obtaining additional data of migrated virtual machines; and
correlating one or more settings of the source guest OS tool settings to one or more settings of the destination guest OS tool settings.

12. The computer-implemented method of claim 8 wherein one of the one or more machine learning techniques comprises using a neural network and the method further comprises:

for each virtual machine from a set of migrated virtual machines, using at least some of the source guest OS tool settings data for a migrated virtual machine as an input feature and using the corresponding destination guest OS tool settings data as ground truth data;
repeating until a stop condition is reached:
inputting a set of input features into a neural network model to predict correlated settings for one or more settings in the destination guest OS tool;
using a comparison of the predicted correlates settings relative to the corresponding destination guest OS tool settings data for the migrated virtual machines to determine an update for the neural network; and
updating one or more parameters of the neural network using the update; and outputting the neural network for predicting destination guest OS tool settings given source guest OS tool settings data.

13. The computer-implemented method of claim 12 further comprises:

responsive to the neural network not obtaining sufficient accuracy in predicting:
obtaining additional training data of migrated virtual machines; and
repeating the steps comprising:
for each virtual machine from the set of migrated virtual machines, using at least some of the source guest OS tool settings data for a migrated virtual machine as an input feature and using the corresponding destination guest OS tool settings data as ground truth data;
repeating until a stop condition is reached:
inputting a set of input features into a neural network model to predict correlated settings for one or more settings in the destination guest OS tool;
using a comparison of the predicted correlates settings relative to the corresponding destination guest OS tool settings data for the migrated virtual machines to determine an update for the neural network; and
updating one or more parameters of the neural network using the update; and
outputting the neural network for predicting destination guest OS tool settings given source guest OS tool settings data.

14. The computer-implemented method of claim 8 wherein the recorded source guest operating system (OS) tool settings data and the recorded destination guest OS tool settings data is obtained from a plurality of organizations.

15. The computer-implemented method of claim 8 further comprising:

given a virtual machine comprising a guest operating system (OS) operating on a source hypervisor that has been selected for migration to a destination hypervisor:
gathering data regarding source guest OS tool settings about the virtual machine operating on the source hypervisor;
obtaining, from a repository, at least some of the set of settings correlation models for the direction-specific migration from the source hypervisor to the destination hypervisor;
using at least some of the gathered data and at least one or more correlation models from the set of setting correlation models for the direction-specific migration, determining a set of correlated settings for the direction-specific migration of the virtual machine from the source hypervisor to the destination hypervisor; and
applying a finalized set of correlated settings obtained from the set of correlated settings to a destination guest OS tool for the virtual machine.

16. A system comprising:
one or more processors; and
a non-transitory computer-readable medium or media comprising one or more sets of instructions which, when executed by at least one of the one or more processors, causes steps to be performed comprising:
given a virtual machine of a first type comprising a guest operating system (OS) operating on a source hypervisor that has been selected for migration to a virtual machine of a second type operating on a destination hypervisor that is of a different type than the source hypervisor:

gathering data regarding source guest OS tool settings about the virtual machine operating on the source hypervisor, in which the source guest OS tool settings help improve performance of the source guest OS in a source hypervisor environment by affecting at least one of data exchange and time synchronization;

obtaining, from a repository, at least some of a set of settings correlation models for a direction-specific migration from the source hypervisor to the destination hypervisor;

using at least some of the gathered data and at least one or more correlation models from the set of setting correlation models for a direction-specific migration, determining a set of correlated settings for the direction-specific migration of the virtual machine from the source hypervisor to the destination hypervisor; and applying a finalized set of correlated settings obtained from the set of correlated settings to a destination guest OS tool for the virtual machine.

17. The system of claim 16 wherein the finalized set of correlated settings are obtained from the set of correlated settings by performing at least one step comprising:

using the set of correlated settings as the finalized set of correlated settings;

updating the set of correlated settings using one or more pre-defined rules that override at least one of the correlated settings in the set of correlated settings;

updating the set of correlated settings using one or more user-supplied inputs; and updating one or more values for one or more correlated settings in the set of correlated settings.

18. The system of claim 16 further comprising:

gathering data regarding source hypervisor-related settings, data regarding the destination hypervisor-related settings, or both; and using at least some the gathered data in determining one or more implementation-related settings for the destination hypervisor for the direction-specific migration.

19. The system of claim 16 further comprising:

for each virtual machine from a set of migrated virtual machines:

recording source guest OS tool settings data about the virtual machine operating on a source hypervisor; and recording destination guest OS tool settings data about the virtual machine operating on a destination hypervisor after migration;

using the source guest OS tool settings data and the corresponding destination guest OS tool settings data for the set of migrated virtual machines as training data to develop at least some of the set of settings correlation models for the direction-specific migration using one or more machine learning techniques; and storing the at least some of the set of settings correlation models for direction-specific migration in a datastore.

20. The system of claim 19 wherein one of the one or more machine learning techniques is a Pearson correlation coefficient that correlates one or more settings in the source guest OS tool settings to one or more settings in the destination guest OS tool settings.

* * * * *